United States Patent
Bellizia et al.

(10) Patent No.: US 10,719,505 B2
(45) Date of Patent: *Jul. 21, 2020

(54) DATABASE SERVER SYSTEM MONITORING

(71) Applicant: International Business Machines Corporation, Armonk, NY (US)

(72) Inventors: Valerio Bellizia, Carpineto Romano (IT); Nicola Milanese, Rome (IT); Stefano Sidoti, Rome (IT); Bernardo Pastorelli, L'Aquila (IT)

(73) Assignee: International Business Machines Corporation, Armonk, NY (US)

(*) Notice: Subject to any disclaimer, the term of this patent is extended or adjusted under 35 U.S.C. 154(b) by 514 days.

This patent is subject to a terminal disclaimer.

(21) Appl. No.: 15/597,458

(22) Filed: May 17, 2017

(65) Prior Publication Data

US 2018/0336227 A1 Nov. 22, 2018

(51) Int. Cl.
*G06F 16/23* (2019.01)
*G06F 16/17* (2019.01)
(Continued)

(52) U.S. Cl.
CPC ...... *G06F 16/2379* (2019.01); *G06F 16/1727* (2019.01); *G06F 16/1734* (2019.01); *G06F 16/2282* (2019.01); *G06F 16/25* (2019.01); *G06F 16/27* (2019.01); *G06F 21/6218* (2013.01); *H04L 67/06* (2013.01); *H04L 67/141* (2013.01); *H04L 67/12* (2013.01); *H04L 67/32* (2013.01)

(58) Field of Classification Search
CPC .................. G06F 16/1734; G06F 16/2379
See application file for complete search history.

(56) References Cited

U.S. PATENT DOCUMENTS 5,715,393 A  2/1998  Naugle
6,023,507 A  2/2000  Wookey
(Continued)

OTHER PUBLICATIONS

Mell et al., "The NIST Definition of Cloud Computing", Recommendations of the National Institute of Standards and Technology, Sep. 2011, U.S. Department of Commerce, 7 pages.
(Continued)

*Primary Examiner* — Kris E Mackes
(74) *Attorney, Agent, or Firm* — Daniel C. Housley

(57) ABSTRACT

An embodiment of the invention includes a database server system comprising a storage arrangement for storing at least one database and at least one processor operable for receiving a database request over a computer network and accessing the storage arrangement. The processor is further operable for carrying out a monitoring task. The monitoring task determines whether a monitoring description has been stored into the database by the database request. Furthermore, the monitoring task performs a monitoring operation which is specified in the monitoring description. The monitoring operation yields at least one result value. The monitoring task submits a monitoring result request in order to insert the at least one result value into the database. The invention also relates to a computer program product and to a method for performing a monitoring operation on a database server system.

18 Claims, 10 Drawing Sheets

(51) Int. Cl.
*H04L 29/08* (2006.01)
*G06F 21/62* (2013.01)
*G06F 16/27* (2019.01)
*G06F 16/22* (2019.01)
*G06F 16/25* (2019.01)

(56) References Cited

U.S. PATENT DOCUMENTS

| | | |
|---|---|---|
| 7,991,851 B2 | 8/2011 | Cheng et al. |
| 8,539,566 B2 | 9/2013 | Peterson et al. |
| 8,661,024 B2 | 2/2014 | Balebail |
| 9,118,538 B1 | 8/2015 | Lekkalapudi et al. |
| 2010/0287347 A1* | 11/2010 | Cameron .............. G06F 12/109 711/162 |
| 2011/0035366 A1 | 2/2011 | Warshawsky |
| 2011/0276951 A1 | 11/2011 | Jain |
| 2013/0179461 A1 | 7/2013 | Sharma et al. |
| 2015/0288753 A1 | 10/2015 | He et al. |
| 2015/0372892 A1 | 12/2015 | Yagoub et al. |
| 2016/0274940 A1 | 9/2016 | Birdsall et al. |

OTHER PUBLICATIONS

Bellizia et al., "Database Server System Monitoring", U.S. Appl. No. 16/386,335, filed Apr. 17, 2019.
List of IBM Patents or Patent Applications Treated as Related, dated Apr. 9, 2019, 2 pages.
Accelerated Examination Support Document, dated Apr. 4, 2019, 25 pages.
Bellizia et al., "Database Server System Monitoring", U.S. Appl. No. 15/893,819, filed Feb. 12, 2018.
List of IBM Patents or Patent Applications Treated as Related, dated Feb. 8, 2018, pp. 1-2.
Accelerated Examination Support Document, dated Jan. 29, 2018, 25 pages.

* cited by examiner

DATABASE SERVER SYSTEM MONITORING

BACKGROUND

The present disclosure relates to how a database server system can be monitored. Computer databases allow storage and access to various types of data. Typically, data is stored in databases within tables. Data may be stored in the database and extracted from the database using database queries. Special types of databases, such as relational databases, may be employed. Databases may run on dedicated server systems; these systems may be dedicated computer systems which allow for remote database access. Databases may be accessed remotely over a computer network. Such a computer network may be a local computer network or a large-scale computer network such as the World Wide Web. Database server systems host one or multiple databases and provide functionality for database access via a computer network. A database server system may allow a multitude of users to simultaneously connect to any hosted database.

To provide information regarding available resources, performance characteristics, or further data related to the operation and the functionality of the database, the database server system typically provides functionality for gathering such information. The information may be the amount of free disk space available on the database server system, the amount of free system memory available on the database server system, the processor load of one or more processors of the database server system, the database server system temperature, or any other measurable system characteristic.

SUMMARY

An embodiment includes a database server system comprising a storage arrangement for storing at least one database and at least one processor operable for receiving a database request over a computer network and accessing the storage arrangement. The processor may also carry out a monitoring task. The monitoring task may determine whether a monitoring description has been stored into the database by the database request. Additionally, the monitoring task may perform a monitoring operation specified in the monitoring description. The monitoring operation may yield one or more result values. The monitoring task may submit a result monitoring request to insert the one or more result values into the database.

Another embodiment relates to a computer program product for performing a monitoring operation. The computer program product comprises a computer readable storage medium having program instructions embodied therewith, wherein the computer readable storage medium is not a transitory signal per se. The program instructions may be readable by a database server system. According to the program instructions, it may be determined whether a monitoring description has been stored into a database associated with the database server system. Additionally, the program instructions may cause a monitoring operation which may be specified in the monitoring description to be performed. The monitoring operation yields one or more result values. Additionally, the program instructions may submit a result monitoring request to insert the one or more result values into the database.

The disclosure also relates to a method for monitoring a database server system. According to the method, a monitoring specification may be transmitted via a database request over a computer network to the database server system, thereby storing a monitoring description into a database. The method comprises determining whether the monitoring description has been stored into the database and performing a monitoring operation specified in the monitoring description. The monitoring operation may yield one or more result values. A result monitoring request may be submitted to insert the one or more result values into the database. The one or more result values may then be transmitted over the computer network.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments herein are presently preferred, it being understood, however, that the invention is not limited to the precise arrangements and instrumentalities shown herein.

DETAILED DESCRIPTION

Figure 1:
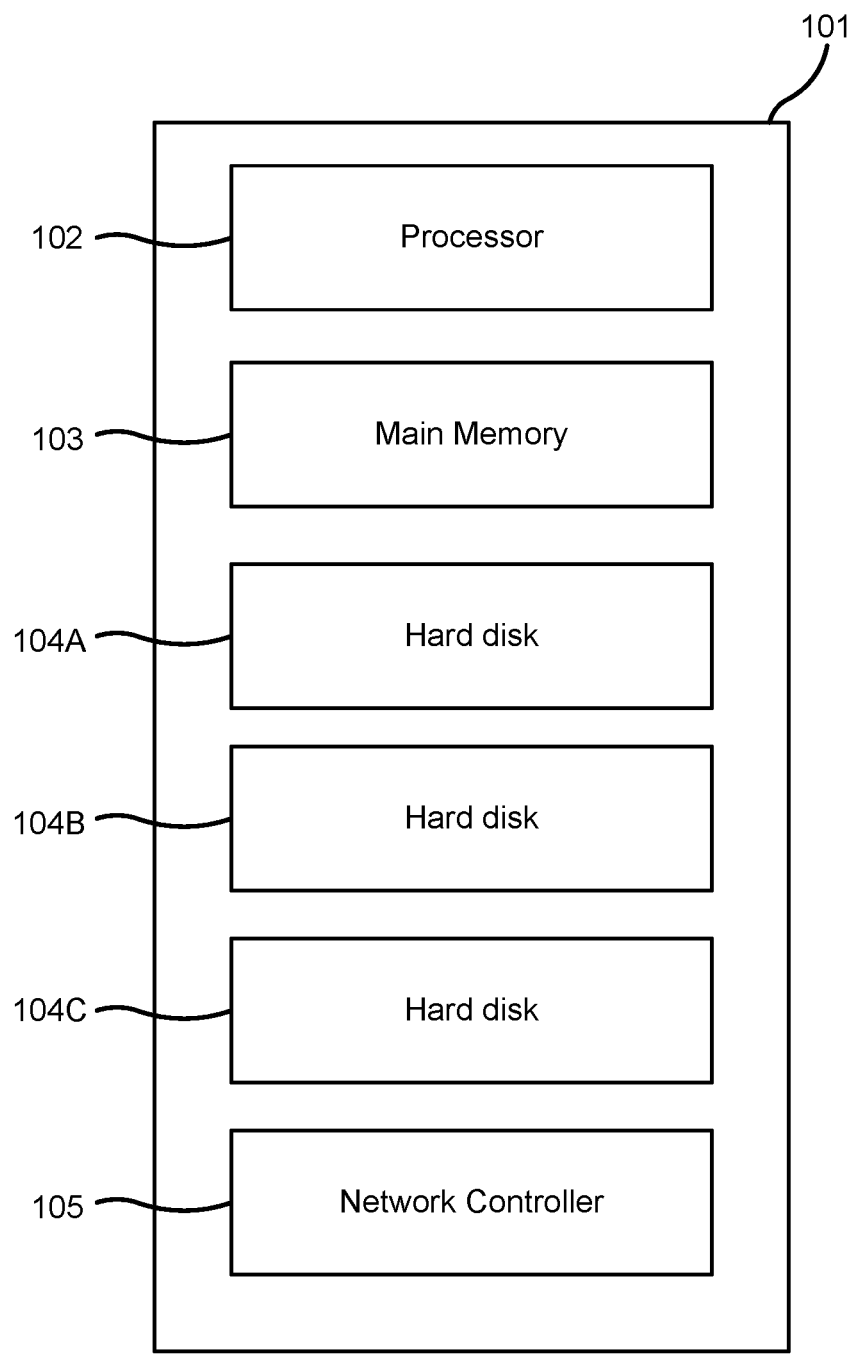
FIG. 1 is a schematic illustration of a database server system, according to embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to embodiments, a database server system comprises a storage arrangement for storing at least one database and at least one processor, operable for receiving a database request over a computer network and accessing the storage arrangement. The processor may also carry out a monitoring task. The monitoring task comprises operations for determining whether a monitoring description has been stored in the database by the database request. Furthermore, the monitoring task may cause a monitoring operation specified in the monitoring description to be performed. The monitoring operation may yield one or more result values. The monitoring task may submit a monitoring result request to insert the one or more result values into the database. According embodiments, the database server system may subsequently transmit the one or more result values over a computer network to a client. According to embodiments, the database server system may receive a database request for the monitoring result from the client, and subsequently transmit the one or more result values back to the client.

Due to security concerns, database server systems may only allow access to the database or the databases contained therein. However, a database may be a system which does not allow a client to obtain information about the state of the database server system on which the database is running. In real-world applications, however, it may be necessary to obtain information about the database server systems. For example, information about the database server system may be required to measure the amount of free system memory remaining on the database server system. Therefore, a separate access path may need to be provided for obtaining information relating to the database server system, for instance via SSH, RDP, Telnet, etc. Additional options for accessing the database server system may lead to decreased system security. The database server system, according to embodiments, may be monitored over a computer network. In embodiments, a monitoring result value may be obtained by a client even though the client only has access to a database of the database server system.

The database server system may receive a database request. According to embodiments of the invention, the database request may include a monitoring description. The database request which includes the monitoring description may be, for example, an SQL query. According to embodiments, the SQL query may be an SQL INSERT query. The monitoring description may specify how the monitoring operation shall be performed. For example, the characteristic of the database server system that is to be monitored may be specified by the monitoring description. This characteristic may be the amount of free disk space available on the database server system, the amount of free system memory available on the database server system, the processor load of one or more processors of the database server system, the temperature of the database server system, or any other system characteristic. According to embodiments, the database server system may provide means for measuring the aforementioned characteristics. After a result of the monitoring has been determined, the result may be stored in the database.

According to embodiments of the invention, the monitoring result request may be an SQL query. The monitoring result request may also be another type of database request. The monitoring result request may also be implemented as any other action which causes the database to store the one or more result values into the database. For example, the monitoring result request may be an inter-process communication, triggered by the monitoring task. The monitoring result request may also be implemented by performing a write operation to write data to a particular memory or hard disk location on the database server system. The database may detect that write operation and include the result into the database.

The database server system may be any type of computer-programmable device featuring a storage arrangement. The storage arrangement may provide at least one entity for data storage. The entities for data storage may include hard disks, flash devices, random access memory or any other entity for data storage. The storage arrangement may contain any number and any type of entity for data storage. According to embodiments, the database server system may be a dedicated database server. However, the database server system may also run tasks which are not related to database processing.

According to embodiments, the database server system hosts a dedicated database. The database may be a relational database. The database may be an in-memory database, where the database resides in the main memory of the database server system. In embodiments, the database may be an active database, including an event-driven architecture that may respond to conditions both inside and outside the database, or a deductive database whose actions may be governed by logic programming. In embodiments, the database may be an instance of a distributed database, where the database server system may host one instance of the distributed database. In embodiments, the database may be a database within a cloud environment. Cloud computing includes a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service.

The database may be a MySQL database, a PostgreSQL database, a MongoDB database, a MariaDB database, a Microsoft SQL Server database, an Oracle database, a Sybase database, an SAP HANA database, an IBM DB2 database or any other type of database. In embodiments, clients may manipulate a database by means of database queries. The database may be capable of processing database queries in the SQL (structured query language) format. However, database queries of other formats may also be accepted according to some embodiments. A database request may trigger various actions by the database. For example, data may be stored into the database and retrieved from the database.

According to embodiments, the database server system may include a communication interface. The communication interface may be a network interface for communication over a local network, over a wide area network and/or over the World Wide Web. The communication interface may provide means for performing authentication and encryption of data sent and received by the database server system.

The database server system may be operated using an operating system such as WINDOWS, LINUX/UNIX, MACOS, or any other operating system. According to embodiments, the operation system may assign different access privileges to different tasks. For instance, some tasks running on the database server system may run in administrator mode. Tasks running in administrator mode may have far-reaching access privileges allowing the tasks not only to execute tasks and to read data files, but also to delete data files and terminate tasks which have been started by a user. Deletion of data files and termination of active tasks may obstruct the operation of the database server system; therefore, care may be taken to ensure that the monitoring task does not negatively affect the operation of the database server system.

According to embodiments, the monitoring task may be instantiated in a virtual memory address space which is separate from a virtual memory address space assigned to operations for receiving the database request and accessing the storage arrangement according to the operation included in the database request. In state of the art operating systems, each process may be assigned a separate virtual address space. Addresses within the virtual address space may be mapped to physical memory addresses. The availability of a virtual address space may facilitate memory management where data is frequently moved between the main system memory and storage media of a computer system. In embodiments, a monitoring task may be executed in an address space that is not assigned to a database of the database server system, and may therefore be capable of measuring a system characteristic of the database server system. However, in embodiments, a monitoring task and a database task may reside in the same address space, or within the same virtual address space.

According to embodiments, the monitoring task may be distinct from a task which runs the database on the database server system. This implies that the monitoring task may not be a part of the database which is run on the database server system. However, the monitoring task may not need to be completely independent from the task which runs the database. For instance, according to some embodiments, the monitoring task may be a child process of a process which runs the database. This means that, according to embodiments, the monitoring task may be started whenever the database is started. According to embodiments, the monitoring task may be completely separate from the database. According to embodiments, the database and the monitoring task may run on different processors.

According to embodiments, operations for receiving the database request may include receiving the monitoring description and writing it to a file on the storage arrangement, the file being external to the database, where the monitoring task checks whether the file has been created or has been updated in order to obtain the monitoring description. The monitoring task may read the file to obtain the monitoring description. In embodiments, the monitoring description may be made available to the monitoring task without the need for the monitoring task to poll the database. According to embodiments, the file may reside in a file system on which the database is stored. According to embodiments, the file may be stored on the same physical storage medium as the database, or on a distinct storage medium which may be part of the storage arrangement. The file may be located within an area of the file system which may only be written to by the database. According to embodiments, the file may be located within an area of a file system which may only be read by the monitoring task.

The file may be stored by the database using a dedicated request for exporting the data to the file system. For example, the database may receive an SQL EXPORT query which triggers a file export operation. According to embodiments, the file may be written to the storage arrangement when the database request with the monitoring description is received by the database. For example, writing the file to the storage arrangement may be triggered when data is written to a specific location within the database. According to embodiments, the file export operation may be triggered whenever the database receives a database request of a certain type, or which submits data identified by the database as a monitoring description. The monitoring task may check repeatedly whether the database has created or updated said file on the storage arrangement. For instance, the monitoring task may check for the creation or for an update of said every 5 seconds, every second, every 10 milliseconds, every millisecond, etc. The file may contain a monitoring description. According to embodiments, the monitoring task may process the monitoring description after it has obtained the monitoring description.

According to embodiments, the monitoring task may obtain the monitoring description by submitting a monitoring description request to the database. This embodiment may allow the monitoring description to be available to the monitoring task on database server systems where the database has no write access to a file system of the storage arrangement. The monitoring description request may be an SQL query. For instance, the database request may be an SQL SELECT query. In this case, a data field may be selected from the database and made available to the monitoring task. The data field may contain the monitoring description. The data field may contain binary data, and it may contain text data, such as a script file.

According to embodiments, the database may be a relational database and comprise a first table for storing the monitoring description and a second table for storing the one or more result values. A database table may comprise columns and rows of data. Data may be stored in cells, where each cell is located in a particular row and in a particular column of the database table. According to embodiments, the monitoring description and the one or more result values may be stored in the same database table, but in separate rows or in separate columns According to embodiments, multiple monitoring descriptions may be stored within one database table. According to embodiments, multiple result values may be stored in one database table. Furthermore, there may be embodiments where separate database tables are provisioned for different users of the database server system.

According to embodiments, a client may send multiple requests which contain monitoring descriptions. The requests may be stored in a first database table, and processed by the monitoring task. The monitoring task may store multiple result values in a second database table. The result values may be retrieved by a client, for instance, by sending an SQL SELECT query to the database server system. According to embodiments, multiple clients may send requests containing monitoring descriptions to the database server system. The monitoring descriptions may be stored in different database tables and processed by the monitoring task. The monitoring task may determine multiple result values which are stored into separate database tables. The aforementioned clients may access the result values, for instance, by sending SQL select queries to the database system. According to embodiments, multiple monitoring descriptions may be processed by multiple monitoring tasks on the database server system, said monitoring tasks running in parallel. According to embodiments, a queue system for monitoring descriptions may be implemented on the database server system so that multiple requests can be processed sequentially by the monitoring task.

According to embodiments, the monitoring description may comprise executable and/or interpretable code for performing the monitoring operation, and the monitoring task may comprise executing and/or interpreting the executable and/or interpretable code. In embodiments, precise instructions for performing the monitoring operation may be provided to the database server system. The executable code may be in a binary format such as an executable file. For instance, an executable file on a WINDOWS system may be an EXE file. However, the binary executable file may also have an alternate format. The executable code may contain instructions for performing a monitoring operation. The executable code may cause the database server system to perform a measurement. The measurement may determine at least one system characteristic, for instance, the amount of free disk space available on the database server system, the amount of free system memory available on the database server system, the processor load of one or more processors of the database server system, the database server system temperature, or any other system characteristic which is measurable.

According to embodiments, the monitoring task may be configured to interface directly with the executable code. For instance, the executable code may deliver a return value directly to the monitoring task so that the one or more result values can be submitted to the database. This may include using a return value, by means of inter-process communication, by means of reading and writing to a data file or a memory location, or by other means of data transmission. According to embodiments, the monitoring task may provide additional information to the executable code. Additional information may be provided to the executable code for instance by means of command line options. Command line options include commands which are appended to the name of a file containing executable code, within a command for executing the code contained within the file. The additional information may comprise specific information the executable code may require to perform the desired measurements. For instance, regarding executable code which is intended to measure the available amount of disk space on the database server system, the monitoring task may provide the executable code with information on the number of hard disks which are part of the storage arrangement and the identifiers of those hard disks. The executable code may use this information to determine the storage space available on said hard disks.

In embodiments, the monitoring description may contain interpretable code. Interpretable code may be code which is human-readable and does not need to be compiled before it can be run by the database server system. The interpretable code may be in the format of a script language such as Python, Ruby, Perl, TCL, or any other script language. The interpretable code may cause the database server system to perform a measurement. The measurement may determine at least one system characteristic, for instance relating to the amount of free disk space available on the database server system, the amount of free system memory available on the database server system, the processor load of one or more processors of the database server system, the database server system temperature, or any other system characteristic which is measurable.

According to embodiments, one or more environments for executing a script language may run on the database server system. The monitoring task may be configured to directly interface with the interpretable code. A return value may be obtained by various ways from the interpretable code. For instance, the interpretable code may provide a return value or data to a file or memory location. As previously described with regard to executable code, it may be possible to provide additional information to interpretable code. For instance, additional information may be provided to the interpretable code by means of command line options.

According to embodiments, the monitoring description comprises executable and/or interpretable code for performing the monitoring operation and metadata related to the executable and/or interpretable code, where the monitoring task uses the metadata to choose a procedure for executing and/or interpreting the code. The metadata may be in a human-readable format or in a binary format. The metadata may describe to the monitoring task how to handle the executable and/or interpretable code. For instance, the metadata may contain information regarding whether the code is executable or interpretable code. If the code is executable code, the metadata may contain information which specifies on which operating system the executable code may be run. Multiple pieces of executable code may be provided within one monitoring description. The monitoring task may choose a suitable piece of executable code using the information obtained from the metadata. Likewise, the metadata may contain information regarding the format of interpretable code provided within the monitoring description. For instance, the metadata may specify which script language the interpretable code conforms to and which version of an environment for running the interpretable code is required.

The metadata may include scheduling information. Scheduling information may describe when to run the executable and/or interpretable code. For instance, it may be specified that the executable and/or interpretable code shall be run with a certain time delay or at a specific time and date. It may be specified that the executable and/or interpretable code shall be run at regular intervals. For instance, the executable and/or interpretable code may be scheduled to run hourly, daily or weekly. The scheduling information may be provided in a format which can be interpreted by either the monitoring task or by a system-wide scheduler. For instance, the scheduling information may be provided in a format which can be interpreted by a CRON daemon on LINUX/UNIX or MACOS X systems. A CRON daemon may be a scheduler which can start recurring tasks. For this purpose, the CRON daemon accesses a so-called CRONTAB file which contains scheduling information. According to embodiments, the monitoring task may interface with the CRON daemon by writing scheduling information into the CRONTAB file. According to embodiments, the monitoring task may also delete scheduling information from the CRONTAB file. The monitoring specification may contain special instructions regarding when to write scheduling information into the CRONTAB file and when to delete said scheduling information from the CRONTAB file.

According to embodiments, the monitoring operation may include determining the amount of free storage space available on the storage arrangement. The term free storage space may refer to storage space available on storage media such as hard disks, on flash drives, on network drives, or on other internal or external drives attached to the database server system. The term free storage may refer to free storage space available in the RAM or another volatile memory of the database server system. The amount of storage space may be determined by running a special system call or operating system command which allows to determine the amount of free storage. Free storage space may be determined using any other process which can be run on the database server system to determine the amount of available free storage space.

Free storage may be determined and returned in a unit such as bytes, kilobytes, megabytes, gigabytes or petabytes. The amount of free storage space may also be returned in any other unit. The monitoring operation may separately determine the amount of free space available on different storage media contained within the storage arrangement. For instance, the monitoring operation may return that 2 gigabytes of free space are available on hard disk A, while 4 gigabytes of free space are available on hard disk B. According to embodiments, the amount of free space available on all storage media within the storage arrangement is first summed up before being returned as a result of the monitoring operation.

The present disclosure is not limited to determining storage space. A wide number of different system characteristics may be measured. According to embodiments, the monitoring task is not limited to only performing a monitoring operation. Further operations may be performed which are not strictly monitoring operations. For instance, the monitoring task may also perform system management operations. A system management operation may perform an action which brings about some type of change to the system. A system management operation may be an operation to free disk space, an operation to connect to an external storage unit, an operation to terminate undesired tasks running on the database server system, or any other operation.

All of the aforementioned operations which are part of the monitoring operation may be performed by executable and/or interpretable code whose execution or interpretation may be started by the monitoring operation. According embodiments, the executable and/or interpretable code may be checked for viruses by a dedicated software for virus scanning which may scan the executable and/or the interpretable code before it is run.

According to embodiments, the monitoring description may be in a compressed data format. The monitoring description may be compressed in a format such as ZIP, RAR, gzip, or any other compressed file format. According to embodiments, the compression format may be a lossless compression format. The term file compression may describe a method whereby an input file with a certain file size is processed so that its file size is reduced. The processed file may no longer be readable by ordinary means, but may require decompression before it can be read again. In embodiments, bandwidth may be saved when the monitoring description is transmitted to the database server system in a compressed format.

The compressed monitoring description may contain multiple files. For instance, the compressed monitoring description may contain a file including executable or interpretable code, and a file which contains metadata. The compressed monitoring description may contain further files specifying how the monitoring description is to be handled. For instance, the description may indicate the field within the database where it should be stored. According to embodiments, data which is not compressed may be prepended or appended to the compressed monitoring description.

According to embodiments, the monitoring description may be transmitted to the database server system as a compressed monitoring description and unpacked before it is stored into the database. According to embodiments, the monitoring description may be extracted by the monitoring task when the monitoring task processes the monitoring description. According to embodiments, the monitoring description may be stored in compressed form within the storage arrangement of the database server system. In this case, the monitoring description may be decompressed whenever it is to be executed.

According embodiments, the monitoring description may not be compressed, and is provided in an uncompressed container format. A container format may contain multiple files, and the files contained therein may not be compressed. The uncompressed container file may be provided in a dedicated container format such as TAR. In embodiments, files may be provided in a container format and not in a compressed format because compression and decompression may require computing resources which are required or reserved for other tasks on the database server system.

According to embodiments, the monitoring task may have restricted access privileges within the database server system. In embodiments, the monitoring task may be prevented from deleting files or carrying out other undesired actions. The monitoring task may have the same access privileges on the database server system as the database server system. In embodiments, the access privileges of the database may be restricted, and therefore the access privileges of the monitoring task may be restricted. In embodiments, this may be the case where the monitoring process is a child process of the database process.

According to embodiments, the database operations include deleting the one or more result values from a field/fields within the database a predetermined amount of time after the one or more result values have been inserted into the database. In embodiments, a result value may not be kept within the database for an indefinite amount of time. For instance, the table may be used by multiple clients and it may be undesirable that a client may obtain a result value which has been requested by another client. This may be prevented by deleting the result value. Additionally, result values may be deleted after a certain amount of time so that the database does not overflow when a large amount of monitoring operations is performed. This is especially relevant in an implementation of the database server system where new result values do not overwrite result values which have been stored previously into the database, and where a new data field is allocated for each new result value.

The disclosure also relates to a computer program product for performing a monitoring operation, the computer program product comprising a computer readable storage medium having program instructions embodied therewith, wherein the computer readable storage medium is not a transitory signal per se, the program instructions readable by a database server system to cause the database server system to perform a method comprising: determining whether a monitoring description has been stored into a database of the database server system, performing a monitoring operation specified in the monitoring description, the monitoring operation yielding one or more result values, and submitting a monitoring result request in order to insert the at least one result value into the database. The computer program product may perform a monitoring task in the database server system. In embodiments, the computer program product may perform a monitoring operation specified by a client even though the client only has access to a limited number of databases in the database server system.

According to embodiments, the computer program product may be capable of performing database queries. The computer program product may be capable of reading and writing data to a storage arrangement, said storage arrangement preferably being a storage arrangement within a database server system. The computer program may perform a monitoring operation, where the monitoring operation may be specified in the monitoring description. Performing the monitoring operation may relate to directly performing a task specified in the monitoring description. Performing the monitoring operation may involve starting another process which performs a task specified in the monitoring description.

According to embodiments, determining whether a monitoring description has been stored into the database by the computer program product comprises monitoring whether a file containing the monitoring description has been created or has been updated within a storage arrangement of the database server system. In embodiments, the monitoring description may be obtained by the computer program product without the computer program product polling the database. For instance, the computer program product may repeatedly check whether a file with a certain name has been created or updated within the storage arrangement. According to embodiments, the computer program product may contain a loop, the loop containing commands which perform a file system check for an update or for the creation of a file containing the monitoring description.

According to embodiments, determining whether a monitoring description has been stored into the database includes submitting a monitoring description request in order to obtain the monitoring description stored in the database. The monitoring description request may be a database request. In particular, the monitoring description may be an SQL query. The computer program product may include code for accessing a database. The computer program product may perform database access over a command line interface, over a network connection, by means of inter-process communication, or by any other means of data transfer. Database access by the computer program product may involve sending data to the database as well as receiving data from the database.

According to embodiments, the computer program product may execute and/or interpret code for performing the monitoring operation, and the code may be contained in the monitoring description. In embodiments, the computer program product may perform monitoring operations according to an executable or interpretable specification. This may include triggering the execution and/or interpretation of said code. For instance, the computer program product may start executable code via a command line or shell interface of an operating system which is running on the database server system. This may involve starting the code so that it is directly executed on the database server system, for instance in the case that the code is provided in .EXE format. According to embodiments, the computer program product invokes an environment for interpreting script code so that the code may be interpreted. For example, an environment for running Python, Ruby, Perl, TCL, or any other script language may be invoked for interpreting the code. According to embodiments, the code which shall be interpreted may be written in a shell script. The computer program product may invoke a shell or command line interface in order to interpret the code.

Performing a monitoring operation may involve running shell or command line operations. Performing a monitoring operation may also involve running portions of executable code. According to embodiments, the computer program product may be capable of processing a monitoring description which contains both executable and interpretable code. The executable and the interpretable code may be run sequentially or in parallel. If multiple executable and/or interpretable pieces of code are included in the monitoring description, these may also be run in parallel.

According to embodiments, the computer program product uses metadata included in the monitoring description to determine how to execute and/or interpret code for performing the monitoring operation, and the code may be contained in the monitoring description. Employing metadata has enables the monitoring task to determine how to execute and/or interpret the code for performing the monitoring operation. Using metadata included in the monitoring description may involve opening a file containing the metadata and interpreting the content of the metadata. The metadata may contain data in a format which can be interpreted by the monitoring task. This format may be a binary format or a human-readable format. The metadata may also be provided in a script language, which may be a common script language such as Python, Ruby, Perl, TCL, or any other script language. The computer program may use the metadata to determine whether the code provided within the monitoring specification shall be executed or interpreted. The computer program product may also use the metadata to determine the scripting language of interpretable code contained in the metadata, so that an appropriate environment for interpreting the code may selected. The computer program product may also employ information from the metadata to determine a schedule according to which the code may be executed or interpreted.

The computer program product may decompress the monitoring description to obtain executable and/or interpretable code contained in the monitoring description. The computer program product may be able to decompress files which are compressed in a format such as ZIP, RAR, gzip, or any other compressed file format. According to embodiments, the computer program product may contain code allowing the computer program product to decompress the monitoring description. According to embodiments, the computer program product may invoke an external computer program so that the monitoring description is decompressed. According to embodiments, the computer program product may decompress the contents of the monitoring description and store them on a hard disk or onto flash storage of the database server system. According to embodiments, the computer program product may decompress the contents of the monitoring description and store them into a main memory of a database server system. For instance, the contents may be stored into a RAM associated with a database server system.

The disclosure also relates to a method for monitoring a database server system. The method may include transmitting a monitoring description via a database request over a computer network to the database server system and storing the monitoring description into a database, determining whether the monitoring description has been stored into the database, performing a monitoring operation specified in the monitoring description, the monitoring operation yielding one or more result values, submitting a monitoring result request in order to insert the one or more result values into the database, and transmitting the result value(s) over the computer network. In embodiments, the method allows a client to perform a monitoring operation on a database server system over a computer network, even though the client only has access to a limited number of databases on the database server system.

A monitoring request may be transmitted by a client to the database server system. The requests may be transmitted over a computer network. The computer network may be a local computer network. For instance, the local computer network may be a network according to the Ethernet standard. The computer network may have any topology, for instance a ring topology, a tree topology or a bus topology. Any type of transmission technology may be employed for data transmission. For instance, data may be transmitted over coaxial cables, over optical fiber, over power lines or over any other transmission media. The computer network which is employed according to somebody embodiments of the invention may be a local area network. According to embodiments, the computer network may be the World Wide Web.

The client may be a computer client system having access privileges to access one or more databases. For instance, the computer client system may be capable of sending requests to a database, and to store data into the database and to retrieve data from the database by means of these requests. Requests may be transmitted in a common database request format. According to embodiments, the requests may be SQL queries.

The database server system may be a computer system which is connected to aforementioned computer network. The database server system may include a database. According to embodiments, the method includes a monitoring description being stored into the database, wherein said monitoring description has previously been transmitted to the database server system over the computer network. According to embodiments, a monitoring task may periodically check whether a monitoring description has been stored into the database. Additionally or alternatively, the monitoring task may check whether a monitoring description has been stored into the database whenever the database is accessed.

A monitoring operation specified in the monitoring specification may be executed. According to embodiments, this monitoring operation may be performed or triggered by aforementioned monitoring task. The monitoring operation may measure a system characteristic. This characteristic may be the amount of free disk space available on the database server system, the amount of free system memory available on the database server system, the processor load of one or more processors of the database server system, the database server system temperature or any other kind of system characteristic. Performing the monitoring operation may also include other operations which may not be considered as measurement operations. For instance, the monitoring operation may also include system maintenance operations.

According to embodiments, a monitoring result request may be submitted to insert the one or more result values into the database after the monitoring operation has been performed. The monitoring result request may be a database request. According to embodiments, the monitoring result request may be an SQL query. The monitoring result request may store one or more result values into the database. Another database request may be submitted to the database to delete a field or fields containing at least one result value from the database.

According to some embodiments of the invention, the one or more result values may be transmitted over the network after the monitoring result request has been completed successfully. The monitoring result request may be transmitted over the network in various ways. For instance, a client may perform a polling request. The client may repeatedly poll the database server system in order to determine whether at least one result value has been written to the database. If at least one result value has been written to the database, the result value may be transmitted to the client over the computer network. According to embodiments, the client may send a subsequent database request to delete the result value from the database of the database server system.

According to embodiments, a client may send a database request to the database server system which contains the monitoring description. The database request may finish when at least one result value has been determined and written into the database. The database server system may transmit the at least one result value to the client. According to embodiments, the client is not required to send a polling request to obtain the result value. According to embodiments, the result value may also be obtained in another manner by the client. For instance, the result value may be transmitted back to the client over a network connection which is not a database connection.

According to embodiments, monitoring operations are performed by a monitoring task located in virtual memory address space separate from the virtual address space within which database operations may be performed on the database server system. Therefore, the monitoring task may be a task which is separate from the database itself. In embodiments, the monitoring task may be executed in an address space which is not assigned to a database of the database server system, and may therefore be capable of measuring a system characteristic of the database server system. The method as described is not limited by to the actions and the means of execution as described above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to the drawings, FIG. 1 shows a schematic illustration of a database server system 101, according embodiments. The database server system 101 may contain a processor 102 and a main memory 103. The database server system 101 may also contain hard disks 104A-C. The hard disks 104A-C may constitute the storage allotment of the database server system 101. The hard disks 104A-C may be special hard disks for servers, optimized for durability, reliability and speed. The storage arrangement may provide a large amount of disk storage on which at least one database may be stored. According to embodiments, the database server system may contain any number of hard drives. According to embodiments, a hard drive may contain other types of data storage, as well. The database server system 101 also comprises a network controller 105. The network controller may be capable of communicating over a network port of the database server system. The database server system 101 may be provided in a rack housing so that it can be mounted in a server rack.

Figure 2:
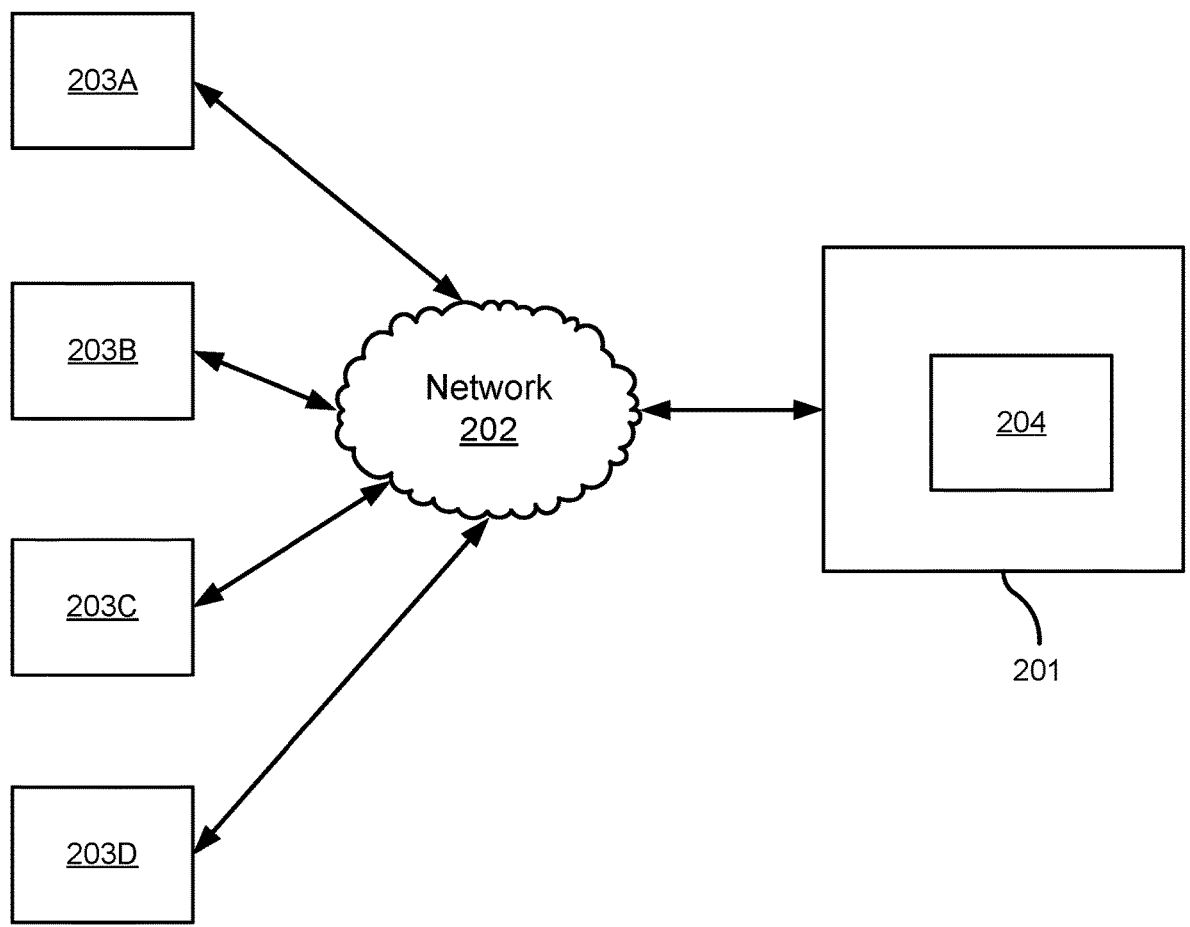
FIG. 2 is a schematic illustration of a database server system in a computer network, according to embodiments.

FIG. 2 is a schematic illustration of a database server system 201, according to embodiments. The database server system 201 may be connected to a computer network 202 which may be a local network such as an Ethernet network, a local area network, the World Wide Web, or any other type of computer network. The database server system 201 may be connected to database clients 203A-D over the computer network 202. The database clients 203A-D may be personal computers, laptop computers, tablet computers, server systems of any kind, mobile phones, or any type of computer or terminal device. The database clients 203A-D may contain software allowing the database 204 to establish database connections to the database server system 201. Such a database connection may be used to store data on the database server system 201 and to retrieve data from the database server system 201.

The database clients 203A-D may use the database server system 201 to store different types of data, for instance business data, backup data or any other type of data. In embodiments, the database clients 203A-D may need to store large amounts of data on the database server system 201. In embodiments, it may be necessary for the database clients 203A-D to determine how much disk space there is still available on the database server system 201. However, because the database clients 203A-D may only have access to a single database 204 located within the database server system 201, and not to any other system functions of the database server system 201, the database clients 203A-D may not be capable of retrieving information relating to the amount of disk space remaining on the database server system 201.

Figure 3:
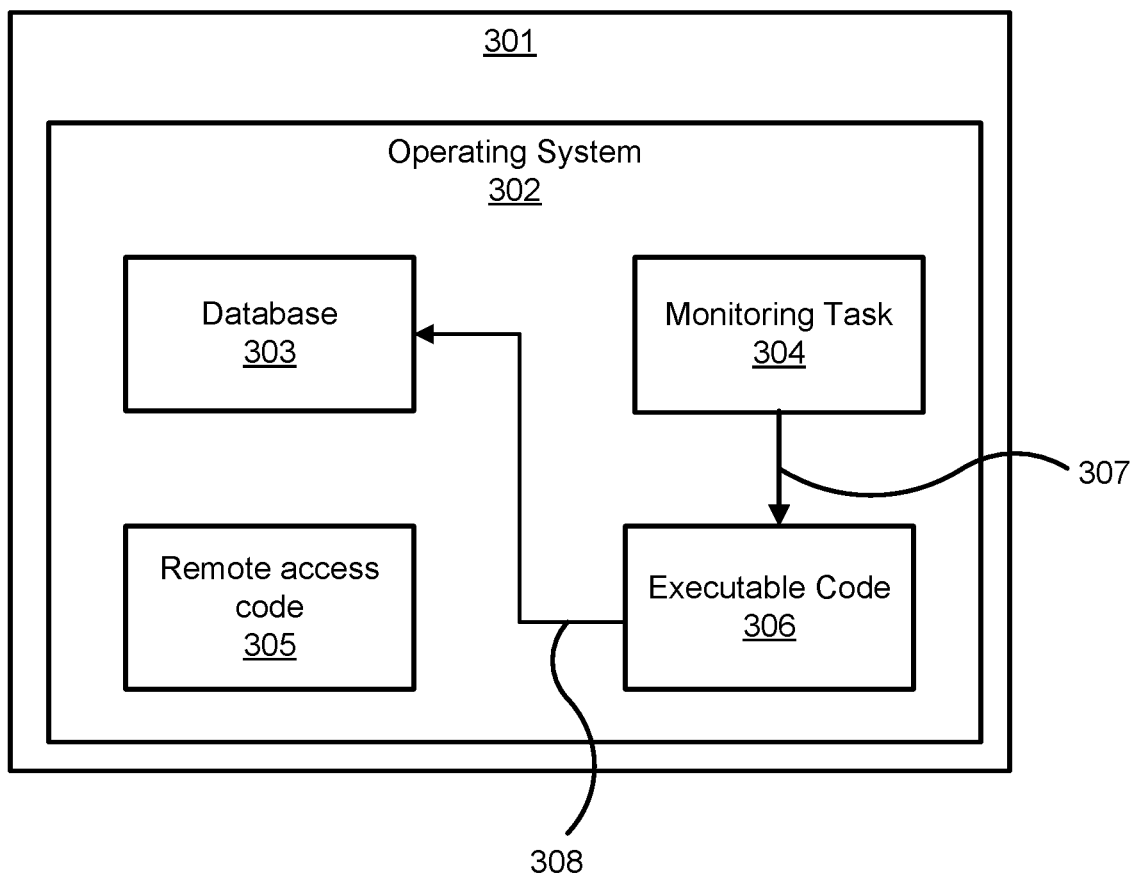
FIG. 3 is a schematic illustration of the organization of software within a database server system, according to embodiments.

FIG. 3 is a schematic illustration of the organization of software within a database server system 301, according to embodiments. The database server system 301 may feature an operating system 302 such as WINDOWS, UNIX/LINUX, MACOS, or any other operating system. A database 303 and a monitoring task 304 may run on the operating system 302. The database server system 301 may feature a remote access code 305. The remote access code 305 may be code which allows access to the database server system 301 via SSH, RDP, Telnet or another method for remote access. The remote access code 305 may allow a client to perform a monitoring operation on the database server system 301. However, the remote access code 305 may only be used by clients with administrator privileges. Because some clients with access to the database 303 may not have administrator privileges, those clients may not use the remote access code 305. Instead, they may transmit a monitoring description to the database 303.

The monitoring task 304 may continuously check whether a monitoring description has been submitted to the computer server system. Once the monitoring task 304 detects that a monitoring description has been submitted to the database server system 301, the monitoring task 304 may extract executable code 306 from the monitoring description via an extraction operation 307. The executable code 306 may then be run in order to perform a monitoring operation. This monitoring operation may return at least one result value which is stored by the executable code 306 into the database 303 via a write-back operation 308.

Figure 4:
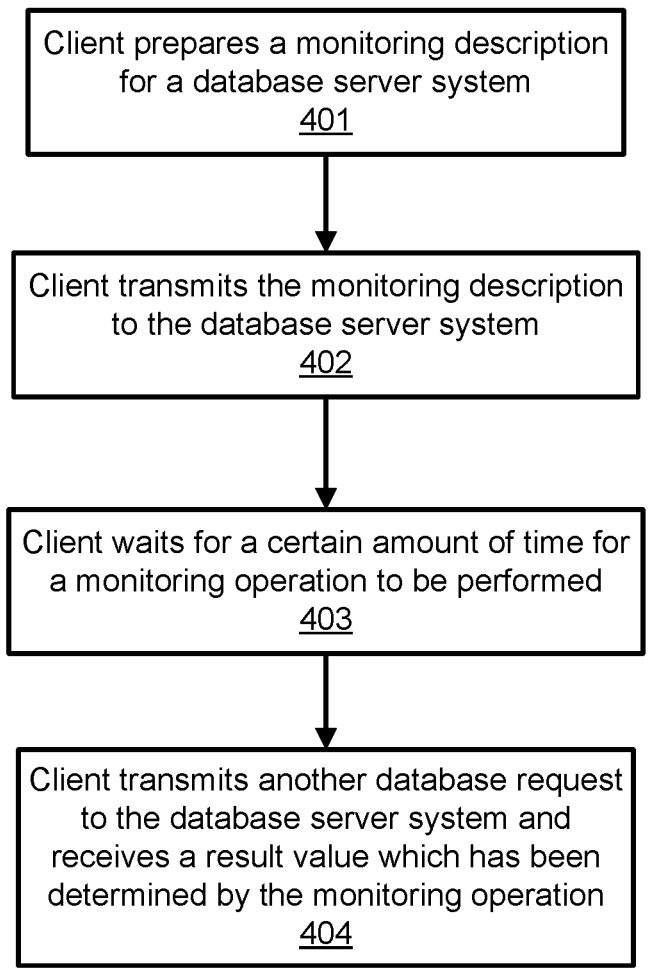
FIG. 4 is a flow chart illustrating a method whereby a client may obtain monitoring information from a database server system, according to embodiments.

FIG. 4 is a flow chart illustrating how a client may obtain monitoring information from a database server system, according to embodiments. At 401, the client may prepare a monitoring description for a database server system. The monitoring description may include executable and/or interpretable code for performing a monitoring operation. At 402, the client may transmit the monitoring description to the database server system. The transmission step 402 may involve transmitting a database request to the database server system, said database request containing the monitoring description. At 403, the client may wait for a certain amount of time for a monitoring operation to be performed. At 404, the client may transmit another database request to the database server system and, in response to the database request, receive a result value which has been determined by the monitoring operation.

Figure 5:
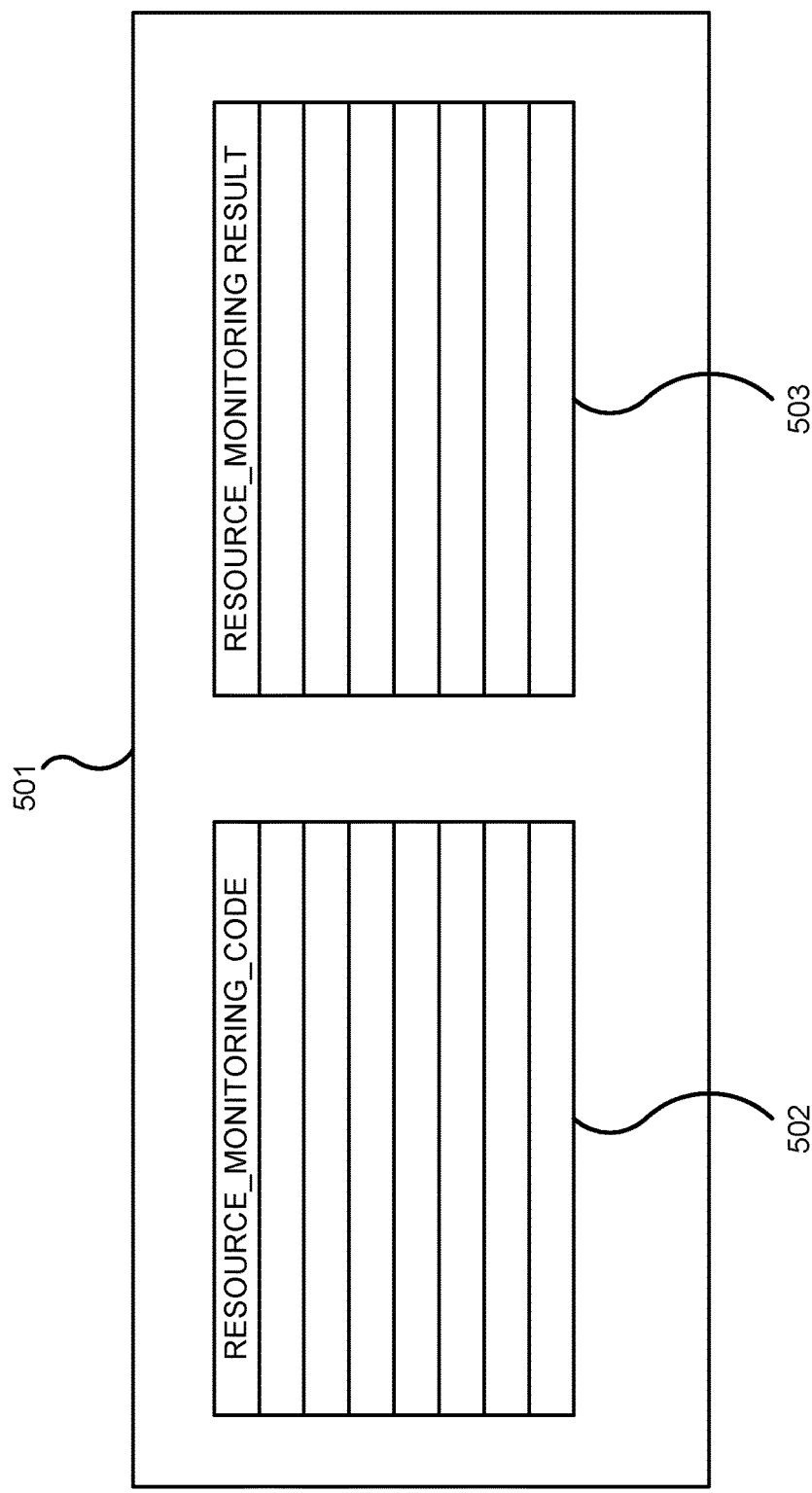
FIG. 5 is a diagram illustrating the structure of a table within a database, according to embodiments.

FIG. 5 is a schematic illustration of database tables within a database 501, according to embodiments. The database 501 may contain a first table 502 for storing monitoring descriptions. This first table 502 may be called RESOURCE_MONITORING_CODE. The database 501 may contain a second table 503 for storing result values. The second table 503 may be called RESOURCE_MONITORING_RESULT. The first table 502 and the second table 503 may store multiple monitoring descriptions and multiple result values, respectively. Monitoring descriptions and result values may be inserted into and removed from the database 501 by database requests.

Figure 6:
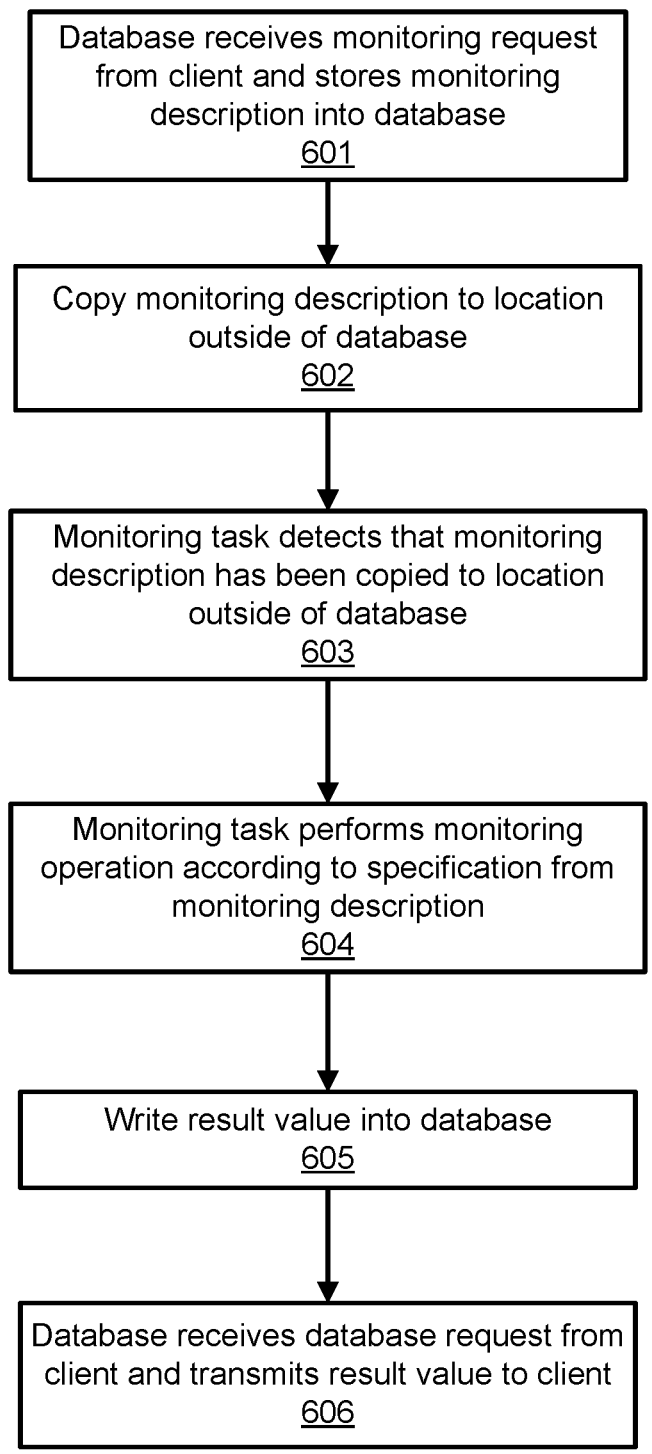
FIG. 6 is a flow chart of a method illustrating actions performed by a database and a monitoring task, according to embodiments.

FIG. 6 is a flow chart illustrating actions performed by a database and a monitoring task, according to embodiments. In a reception step 601, the database may receive a database request from a client. The database request may store a monitoring description into the database. According to embodiments, the database request may be an SQL INSERT query. At 602, the monitoring description may be copied to a location outside of the database. The copy step may involve the execution of an SQL EXPORT query to trigger the copy step. A detection step 603 may follow after the copy step 602. At 603, a monitoring task may detect that the monitoring description has been copied to a location outside of the database. At 604, the monitoring task may perform a monitoring operation according to the monitoring description. The monitoring operation may involve measuring a system characteristic according to the monitoring specification. The monitoring operation may yield a result value. At 605, the result value may be written into the database. According to embodiments, a database request may perform the write-back step 605. At 606, the database may receive a database request from a client and may transmit the result value to the client. According to embodiments, this database request may be an SQL SELECT query.

Figure 7:
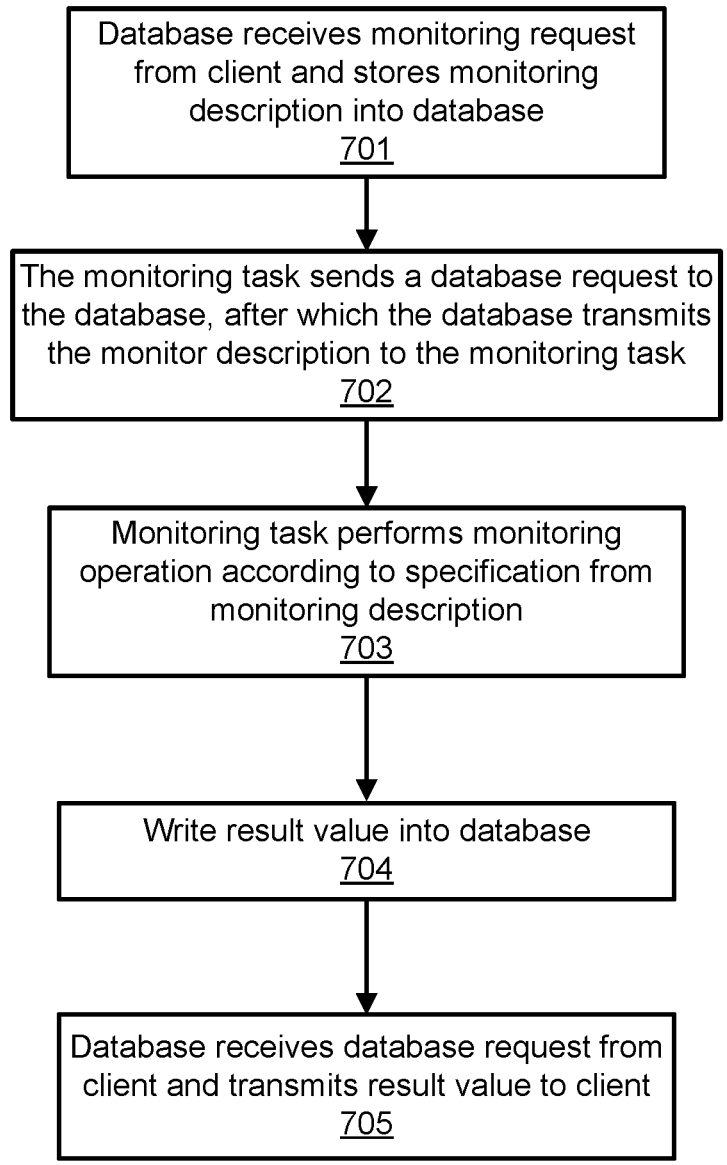
FIG. 7 is a flow chart of a method illustrating actions performed by a database and a monitoring task, according to embodiments.

FIG. 7 is a flow chart illustrating actions performed by a database and a monitoring task, according embodiments. At 701, the database may receive a database request from a client. The database request may store a monitoring description into the database. According to embodiments, the database request may be an SQL INSERT query. At 702, the monitoring task may send a database request to the database. According to embodiments, the database request sent by the monitoring task may be an SQL SELECT query. The monitoring task may obtain the monitoring description via this database request. At 703, the monitoring task may perform a monitoring operation according to a specification from the monitoring description. The monitoring operation may involve measuring a system characteristic according to the monitoring specification. The monitoring operation may yield a result value. At 704, the result value may be entered into the database. According to embodiments, the write-back step 704 may be performed by a database request. At 705, the database may receive a database request from a client and may transmit the result value to the client. According to embodiments, said database request may be an SQL SELECT query.

Figure 8:
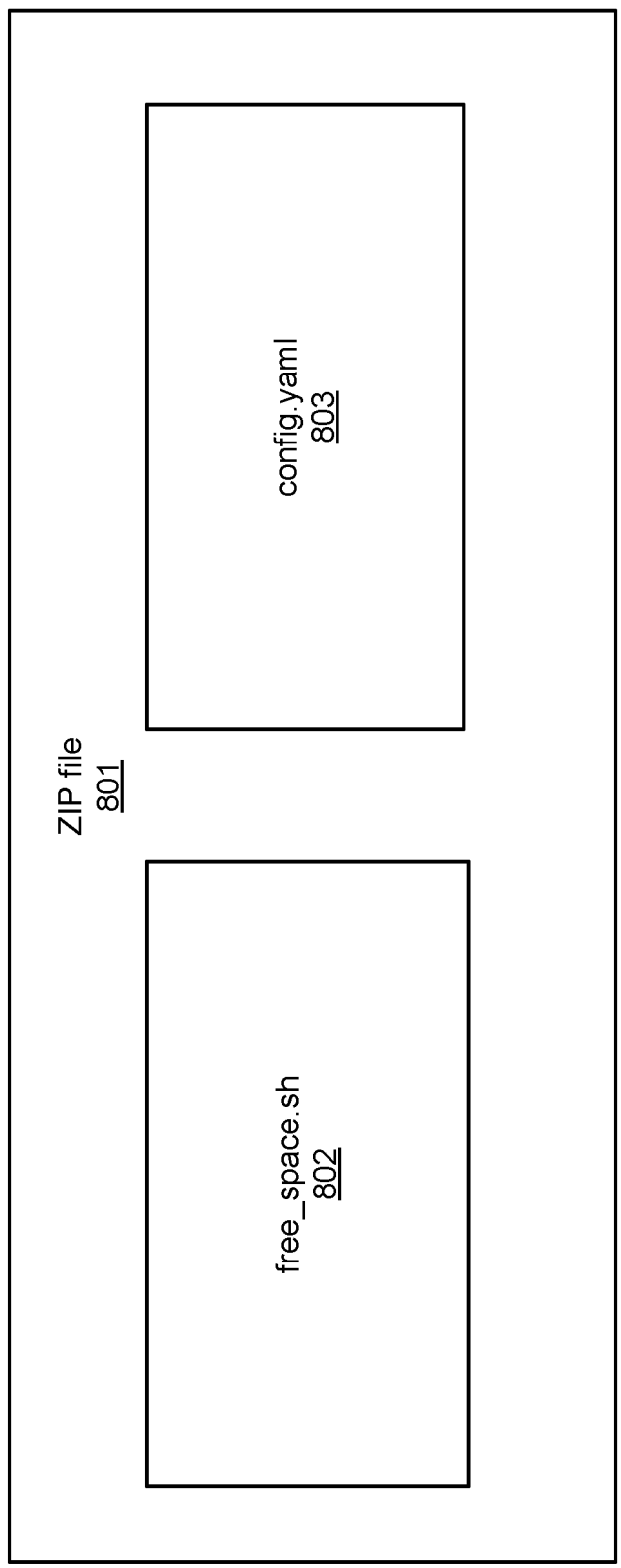
FIG. 8 is a schematic illustration of a monitoring description, according to embodiments.

FIG. 8 is a schematic illustration of a monitoring description in a file container 801 according to embodiments. The monitoring description may feature an interpretable code file 802 and a metadata file 803. The interpretable code file 802 and the metadata file 803 may be two separate data files encapsulated by the file container 801. The file container 801 may be a ZIP file. The interpretable code file 802 may be named free_space.sh and may contain a shell script that may be run on certain LINUX/UNIX systems. Upon execution, the shell script may determine the amount of free disk space available on the host system. The metadata file 803 may have the file name config.yaml. The metadata contained therein may be stored in a markup language. For instance, the contents of the metadata file 803 may be as follows:

PackageName: Available Disk Space
Executable: free_space.sh
Schedule: <schedule_rule>
Content: free_space.sh The metadata file 803 may specify the name of the monitoring description, the name of a code file 802 which is to be executed or interpreted, scheduling information, a list of non-metadata files included in the monitoring description, etc. The schedule information may presently only represent symbolically here by the text string <schedule_rule>. According to embodiments, the metadata file 803 may contain further data fields. For instance, a data field may contain command line arguments for the executable or interpretable code.

Figure 9:
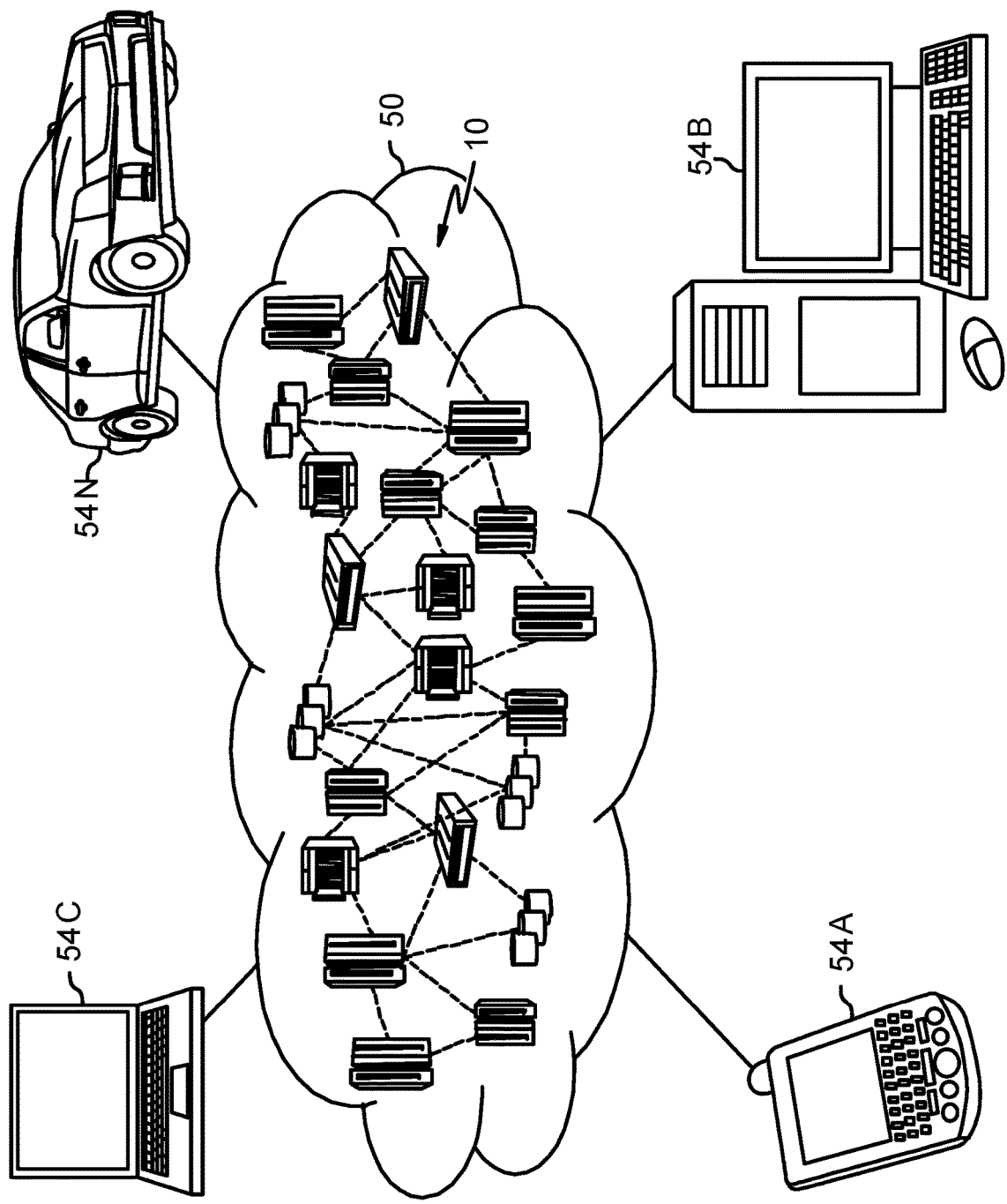
FIG. 9 depicts a cloud computing environment, according to embodiments.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
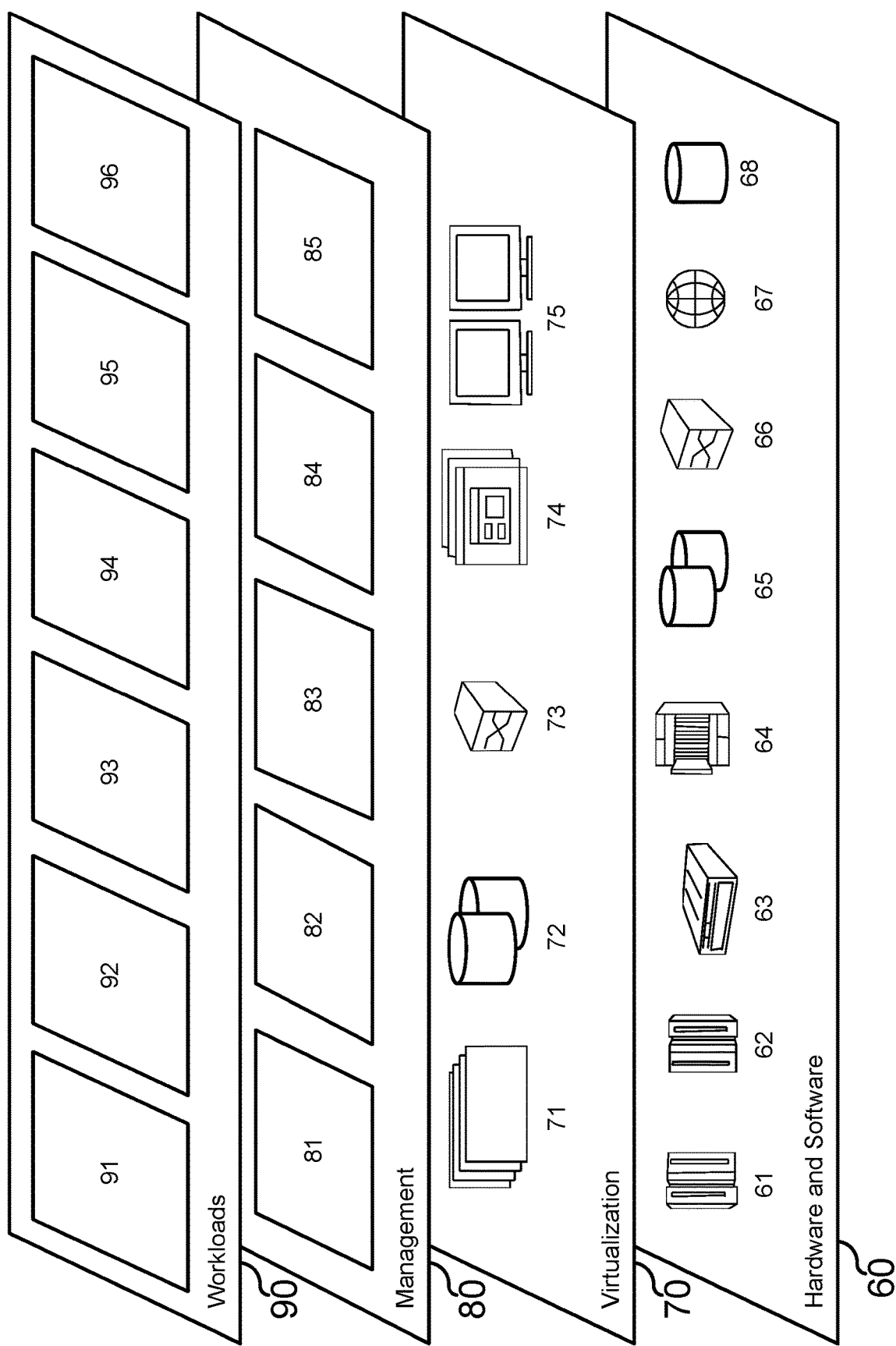
FIG. 10 depicts abstraction model layers according, to embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database server system monitoring 96.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A database server system including a storage arrangement for storing at least one database and at least one processor operable for receiving a database request over a computer network and accessing the storage arrangement, wherein the processor is further operable for carrying out a monitoring task, the monitoring task comprising:
   receiving, from a client, a compressed monitoring description via the database request over the computer network at the database server system and storing the monitoring description into a database, wherein the storing further includes writing the monitoring description to a file on the storage arrangement, the file being external to the database;
   determining whether the monitoring description has been stored into the database by the database request;
   in response to determining that a monitoring description has been stored into the database, performing a monitoring operation specified in the monitoring description in the file, the monitoring operation yielding one or more result values;
   wherein the monitoring task is instantiated in a first virtual memory address space, separate from a second virtual memory address space assigned to operations for receiving the database request and accessing the storage arrangement; and
   submitting a monitoring result request to insert the one or more result values into the database.

2. The database server system according to claim 1, wherein the monitoring task checks whether the file has been updated to obtain the monitoring description.

3. The database server system according to claim 1, wherein the monitoring task obtains the monitoring description by submitting a monitoring description request to obtain the monitoring description stored in the database.

4. The database server system according to claim 1, wherein the database is a relational database and comprises a first table for storing the monitoring description and a second table for storing the at least one result value.

5. The database server system according to claim 1, wherein the monitoring description comprises executable code for performing the monitoring operation, and the monitoring task comprises executing the executable code.

6. The database server system according to claim 1, wherein the monitoring description comprises executable code for performing the monitoring operation, and metadata related to the executable code, wherein the monitoring task uses the metadata to choose a procedure for executing the code.

7. The database server system according to claim 1, wherein the monitoring operation includes determining the amount of free storage space available on the storage arrangement.

8. The database server system according to claim 1, wherein the monitoring description is in a compressed data format within the file on the storage arrangement.

9. The database server system according to claim 1, wherein the monitoring task has restricted access privileges within the database server system.

10. The database server system according to claim 1, wherein the database operations include deleting the one or more result values from fields within the database according to a predetermined amount of time after the one or more result values have been inserted into the database.

11. The database server system according to claim 1, wherein software is provided as a service in a cloud environment to establish database connections between the database server system and one or more clients.

12. A computer program product for performing a monitoring operation, the computer program product comprising a computer readable storage medium having program instructions embodied therewith, the program instructions readable by a database server system to cause the database server system to perform a method comprising:
   receiving, from a client, a compressed monitoring description via a database request over a computer network at the database server system and storing the monitoring description into a database, wherein the storing further includes writing the monitoring description to a file on a storage arrangement, the file being external to the database;
   determining whether the monitoring description has been stored into the database;
   in response to determining that a monitoring description has been stored into the database, performing a monitoring operation specified in the monitoring description in the file, the monitoring operation yielding one or more result values;
   wherein monitoring operations are performed by a monitoring task instantiated in a first virtual memory address space, separate from a second virtual memory address space assigned to operations for receiving the database request and accessing the storage arrangement; and
   submitting a monitoring result request to insert the one or more result values into the database.

13. The computer program product according to claim 12, wherein determining whether the monitoring description has been stored into the database comprises monitoring whether the file containing the monitoring description has been updated within the storage arrangement of the database server system.

14. The computer program product according to claim 12, wherein determining whether the monitoring description has been stored into the database includes submitting a monitoring description query to obtain the monitoring description stored in the database.

15. The computer program product according to claim 12, wherein the computer program executes code for performing the monitoring operation, the code being contained in the monitoring description.

16. The computer program product according to claim 12, wherein the computer program uses metadata included in the monitoring description to determine how to execute code for performing the monitoring operation, the code being contained in the monitoring description.

17. The computer program product according to claim 12, wherein the computer program decompresses the monitoring description to obtain executable code contained in the monitoring description.

18. A method for monitoring a database server system, the method comprising:
- receiving, from a client a compressed monitoring description via a database request over a computer network at the database server system and storing the monitoring description into a database, wherein the storing further includes writing the monitoring description to a file on a storage arrangement, the file being external to the database;
- determining whether the monitoring description has been stored into the database;
- in response to determining that the monitoring description has been stored into the database, performing a monitoring operation specified in the monitoring description in the file, the monitoring operation yielding one or more result values;
- wherein monitoring operations are performed by a monitoring task located in a first virtual memory address space, separate from a second virtual memory address space assigned to operations for receiving the database request and accessing the storage arrangement;
- submitting a monitoring result request to insert the one or more result values into the database; and
- transmitting the one or more result values over the computer network.

\* \* \* \* \*